United States Patent [19]
Cooper et al.

[11] 3,974,235
[45] Aug. 10, 1976

[54] BLENDS OF A POLYPHENYLENE ETHER RESIN, ALKENYL AROMATIC RESINS MODIFIED WITH EPDM RUBBER AND FLAME RETARDANT

[75] Inventors: Glenn D. Cooper; Visvaldis Abolins, both of Delmar, N.Y.

[73] Assignee: General Electric Company, Pittsfield, Mass.

[22] Filed: Dec. 19, 1974

[21] Appl. No.: 534,272

Related U.S. Application Data

[62] Division of Ser. No. 401,986, Oct. 1, 1973.

[52] U.S. Cl. ............... 260/876 R; 260/42.18; 260/42.43; 260/42.47; 260/45.7 P; 260/45.75 B; 260/45.7 R; 260/DIG. 24
[51] Int. Cl.² .................................. C08L 51/06
[58] Field of Search ............... 260/876 R, DIG. 24, 260/45.7 P

[56] References Cited
UNITED STATES PATENTS

| | | | |
|---|---|---|---|
| 3,639,506 | 2/1972 | Haaf | 260/874 |
| 3,658,945 | 4/1972 | Nakashio et al. | 260/876 R |
| 3,663,654 | 5/1972 | Haaf | 260/874 |
| 3,686,362 | 8/1972 | Hinckley et al. | 260/876 R |

*Primary Examiner*—Carman J. Seccuro
*Attorney, Agent, or Firm*—William F. Mufatti; Edward A. Hedman; James V. Costigan

[57] ABSTRACT

Novel compositions are disclosed which include a polyphenylene ether resin and an alkenyl aromatic resin modified with an EPDM rubber. Also included with the scope of this invention are reinforced and flame-retardant compositions of said polyphenylene ether resin and said alkenyl aromatic resin modified with an EPDM rubber.

9 Claims, No Drawings

BLENDS OF A POLYPHENYLENE ETHER RESIN, ALKENYL AROMATIC RESINS MODIFIED WITH EPDM RUBBER AND FLAME RETARDANT

This is a division of application Ser. No. 401,986, filed Oct. 1, 1973.

This invention relates to compositions of a polyphenylene ether resin and an alkenyl aromatic resin that is modified with an EPDM rubber. Reinforced and flame-retardant blends are also provided.

BACKGROUND OF THE INVENTION

The term "polyphenylene ether resin" includes a family of polymers well known to those skilled in the art, and they are made by a variety of catalytic and non-catalytic processes from the corresponding phenols or reactive derivatives thereof. By way of illustration, certain of the polyphenylene ethers are disclosed in Hay, U.S. Pat. Nos. 3,306,874 and 3,306,875, and in Stamatoff, U.S. Pat. Nos. 3,257,357 and 3,257,358. In the Hay patents, the polyphenylene ethers are prepared by an oxidative coupling reaction comprising passing an oxygen-containing gas through a reaction solution of a phenol and a metal-amine complex catalyst. Other disclosures relating to processes using metal-amine catalyst are found in Bussink et al, U.S. Pat. No. 3,337,499; Blanchard et al, U.S. Pat. No. 3,219,626; Laakso et al, U.S. Pat. No. 3,342,892; Borman, U.S. Pat. No. 3,344,166; Hori et al, U.S. Pat. No. 3,384,619; Faurote et al, U.S. Pat. No. 3,440,217; and disclosures relating to metal based catalysts which do not include amines, are known from patents such as Wieden et al, U.S. Pat. No. 3,442,885 (copper-amidines); Nakashio et al, U.S. Pat. No. 3,573,257 (metal-alcoholate or -phenolate); Kobayashi et al, U.S. Pat. No. 3,455,880 (cobalt chelates); and the like. In the Stamatoff patents, the polyphenylene ethers are produced by reacting the corresponding phenolate ion with an initiator, such as peroxy acid salt, an acid peroxide, a hypohalite, and the like, in the presence of a complexing agent. Disclosures relating to non-catalytic processes, such as oxidation with lead dioxide, silver oxide, etc. are described in Price et al, U.S. Pat. No. 3,382,212. All of the above-mentioned disclosures are incorporated herein by reference.

The term "alkenyl aromatic resin" includes polymers and copolymers of styrene, alpha methyl styrene, chlorostyrene, ethylvinylbenzene, divinylbenzene, vinylnaphthalene and the like.

The term "EPDM" includes rubbery interpolymers of a mixture of mono-olefins and a polyene. Preferred type are those rubbery interpolymers of ethylene, an alpha-olefin and a polyene.

In the prior art rubber-modified styrene resins have been admixed with polyphenylene ether resins to form compositions that have modified properties. The Cizek patent, U.S. Pat. No. 3,383,435 disclosed rubber-modified styrene resin-polyphenylene ether resin composition wherein the rubber componenet is of the unsaturated type such as polymers and copolymers of butadiene. The physical properties of these compositions are such that it appears that many of the properties of the styrene resins have been upgraded, while the moldability of the polyphenylene ethers are improved.

Ger. Offen. 2,047,613 discloses that less than 30 by weight of an EPDM modified styrene resin may be used to upgrade the impact strength of polyphenylene ether resins. There is no suggestion to use higher amounts or that higher amounts will improve the oxidative stability and color stability of a polyphenylene ether composition.

It has now been found that when the highly unsaturated rubber that is used in composition of the type disclosed by Cizek, is replaced with EPDM rubber that has a low degree of residual unsaturation, the thermal oxidative stability and color stability are improved.

It is, therefore, a primary object of this invention to provide improved compositions of polyphenylene ether resins and modified alkenyl aromatic resins.

Another object of this invention is to provide molding compositions and molded articles of a polyphenylene ether resin and a modified alkenyl aromatic resin which have improved thermal oxidative stability.

Still another object of this invention is to provide molding compositions and molded articles of a polyphenylene ether resin and a modified alkenyl aromatic resin which have improved color stability.

It is also an object of this invention to provide the above-described, improved molding compositions in particular embodiment that are reinforced and/or flame retardant.

DESCRIPTION OF THE INVENTION

The above-mentioned advantages and objects and others will be readily apparent to those skilled in the art by the following compositions.

Preferred types will include thermoplastic compositions which comprise:

a. from 20–65% by weight of a polyphenylene ether resin and b. from 35–80% by weight of an alkenyl aromatic resin that is modified with an EPDM rubber, that is, a rubbery interpolymer of a mixture of mono-olefins and a polyene. These rubbery interpolymers include those prepared from ethylene, an alpha-olefin and a polyene. Preferred types comprise 10–90 mole percent of ethylene, 10–90 mole percent of an alpha-olefin containing 3–16 carbon atoms and 0.1–10 mole percent of a polyene that is a non-conjugated cyclic or open-chain diene that has from 4–20 carbon atoms. Especially preferred are those alpha-olefins having 3–10 carbon atoms and non-conjugated cyclic or open-chain diene having from 5–10 carbon atoms.

The alkenyl aromatic resins are well known and are derived from monomers of the formula:

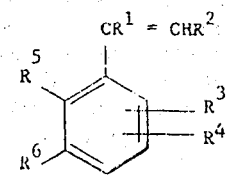

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group. These compounds are free of any substitute that has a tertiary carbon atom.

Specific examples of alkenyl aromatic monomers include styrene, chlorostyrene, alpha-methylstyrene, vinyl xylene, divinylbenzene and vinyl naphthalene.

The preferred polyphenylene ethers are of the formula:

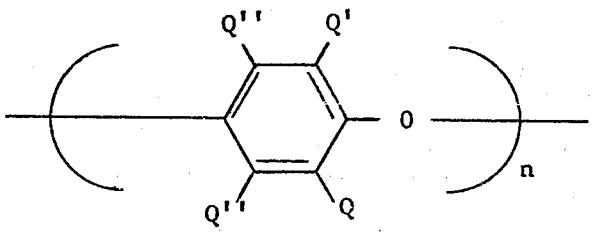

wherein Q is selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atoms and the phenol nucleus, Q' and Q'' are the same as Q, and in addition, halogen with the proviso that Q and Q' are all free of a tertiary carbon atom; and $n$ is an integer of at least 50.

Especially preferred is poly (2,6-dimethyl-1,4-phenylene) ether.

The alkenyl aromatic resin that is modified with a rubbery interpolymer of a mixture of mono-olefin and a polyene may be prepared by dissolving the rubbery interpolymer in the alkenyl aromatic monomer and polymerizing the mixture in the presence of a free-radical initiator until 90–100% by weight of the alkenyl aromatic monomer has reacted to form said modified alkenyl aromatic resin. These materials are commercially available, such as the product Taflite 925–01 which is a suspension polymerized EPDM modified, high-impact polystyrene that contains about 12% of benzene insoluble rubber and the average rubber particle size is about 8–10 microns. The EPDM componenet appears to be an ethylene-propylene-ethylidene norbornene terpolymer. They are also described in U.S. Pat. No. 3,538,192, which is hereby incorporated by reference. Also, the EPDM rubbers are described in: Vinyl and Allied Polymer, P. D. Ritchie, Volume 1, Page 121 (1968) and the EPDM modified resins are described in: J. Appl. Polymer Sci., Volume 16, Pages 1125–1138 (1972) which are also incorporated by reference. The preferred modified alkenyl aromatic resins are those made with an EPDM rubbery interpolymer of ethylene, propylene and 5-ethylidene-2-norbornene and styrene. Preferred modified alkenyl aromatic resins will include from about 5 to about 20% by weight of rubbery interpolymer.

As reinforcing fillers, there may be employed reinforcing amounts of reinforcing filler. In general, any reinforcement can be used, e.g., aluminum, iron or nickel, and the like, and non-metals, e.g., carbon filaments, silicates, such as acicular calcium silicate, asbestos, $TiO_2$, potassium titanate and titanate whiskers, glass flakes and fibers and the like. It is to be understood that, unless the filler adds to the strength and stiffness of the composition, it is only a filler and not a reinforcing filler as contemplated herein. In particular, the reinforcing fillers increase the flexural strength, the flexural modulus, the tensile strength and the heat distortion temperature.

Although it is only necessary to have at least a reinforcing amount of the reinforcement present, in general, the combination of components (a) and (b) will comprise from about 10 to about 90 parts by weight and the filler will comprise from about 10 to about 90 parts by weight of the total composition.

In particular, the preferred reinforcing fillers are of glass and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastics reinforcement are made by mechanical pulling. The filament diameters range from about 0.000112 to 0.00075 inch, but this is not critical to the present invention.

In general, best properties will be obtained if the sized filamentous glass reinforcement comprises from about 1 to about 80% by weight based on the combined weight of glass and polymers and preferably from about 10 to about 50% by weight. Especially preferably the flass will comprise from about 10 to about 40% by weight based on the combined weight of glass and resin. Generally, for direct molding use, up to about 60% of glass can be present without causing flow problems. However, it is useful also to prepare the compositions containing substantially greater quantities, e.g., up to 70–80% by weight of glass. These concentrations can then be custom blended with blends of resins that are not glass reinforced to provide any desired glass content of a lower value.

The length of the glass filaments and whether or not they are bundled into fibers and the fibers bundled in turn to yarns, ropes or rovings, or woven into mats, and the like, are also not critical to the invention. However, in preparing the present compositions it is convenient to use the filamentous glass in the form of chopped strands of from about ⅛ inch to about 1 inch long, preferably less than ¼ inch long. In articles molded from the compositions, on the other hand, even shorter lengths will be encountered because, during compounding, consideable fragmentation will occur. This is desirable, however, because the best properties are exhibited by thermoplastic injection molded articles in which the filament lengths lie between about 0.000005 inch and 0.125 (⅛ inch).

Because it has been found that certain commonly used flammable sizings on the glass, e.g., dextrinized starch or synthetic polymers, contribute flammability often in greater proportion than expected from the amount present, it is preferred to use lightly sized or unsized glass reinforcements in those compositions of the present invention which are flame retardant. Sizings, if present, can readily be removed by heat cleaning or other techniques well known to those skilled in the art.

It is a preferred feature of this invention also to provide flame retardant thermoplastic compositions, as defined above by modifying the composition to include a flame-retardant additive in a minor proportion but in an amount at least sufficient to render the composition non-burning or self-extinguishing.

A preferred feature of the invention is a flame-retardant composition as above defined, which also includes a halogenated organic compound, a halogenated organic compound in admixture with an antimony compound, elemental phosphorus or a phosphorus compound or compounds containing phosphorus-nitrogen bonds or a mixture of two or more of the foregoing.

When used herein, the terms "non-burning", "self-extinguishing" and "non-dripping" are used to describe compositions which meet the standards of ASTM test method D-635 and Underwriters' Laboratories Bulletin No. 94. Another recognized procedure to determine flame resistance of resinous compositions is the Oxygen Index Test or LOI (Limiting Oxygen Index). This test is a direct measure of a product's combustibility, based on the oxygen content of the combustion atmosphere. Appropriate specimens are placed in a combustion chimney and the oxygen is reduced stepwise until the material no longer supports a flame. The LOI is defined as the precent oxygen times 100 divided by the sum of the percentages of nitrogen and oxygen in the gas used to burn the material under test. Further details of the Oxygen Index Test are found in ASTM test Method D-2863. The compositions of this invention which contain flame-retardant additives in the specified amounts have a substantially higher oxygen index and thus are much less combustible than the controls.

The flame-retardant additives useful in this invention comprise a family of chemical compounds well known to those skilled in the art. Generally speaking, the more important of these compounds contain chemical elements employed for their ability to impart flame resistance, e.g., bromine, chlorine, antimony, phosphorus and nitrogen. It is preferred that the flame-retardant additive comprise a halogenated organic compound (brominated or chlorinated); a halogen-containing organic compound in admixture with antimony oxide; elemental phosphorus or a phosphorus compound; a halogen-containing compound in admixture with a phosphorus compound or compounds containing phosphorus-nitrogen bonds or a mixture of two or more of the foregoing.

The amount of flame-retardant additive used is not critical to the invention, so long as it is present in a minor proportion based on said composition — major proportions will detract from physical properties — but at least sufficient to render the polyphenylene ether-modified alkenyl aromatic polymer blend non-burning or self-extinguishing. Those skilled in the art are well aware that the amount will vary with the nature of the polymers in the blend and with the efficiency of the additive. In general, however, the amount of additive will be from 0.5 to 50 parts by weight per hundred parts of components (a) plus (b). A preferred range will be from about 3 to 25 parts and an especially preferred range will be from about 5 to 15 parts of additive per 100 parts of (a) plus (b). Smaller amounts of compounds highly concentrated in the elements responsible for flame-retardance will be sufficient, e.g., elemental red phosphorus will be preferred at 0.5 to 10 parts by weight per hundred parts of (a) plus (b), while phosphorus in the form of triphenyl phosphate will be used at 5 to 25 parts of phosphate per part of (a) plus (b), and so forth. Halogenated aromatics will be used at 2 to 20 parts and synergists, e.g., antimony oxide, will be used at about 1 to 10 parts by weight per 100 parts of components (a) plus (b).

Among the useful halogen-containing compounds are those of the formula

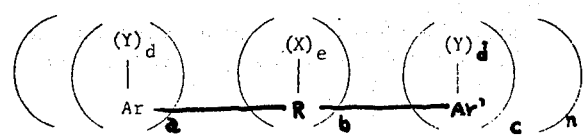

wherein $n$ is 1 to 10 and R is an alkylene, alkylidene or cycloaliphatic linkage, e.g., methylene, ethylene, propylene, isopropylene, isopropylidene, butylene, isobutylene, amylene, cyclohexylene, cyclopentylidene, and the like; a linkage selected from the group consisting of ether; carbonyl; amine; a sulfur-containing linkage, e.g., sulfide, sulfoxide, sulfone, carbonate; a phosphorus-containing linkage; and the like. R can also consist of two or more alkylene or alkylidene linkages connected by such groups as aromatic, amino, ether, ester, carbonyl, sulfide, sulfoxide, sulfone, a phosphorus-containing linkage, and the like. R can be a dihydric phenol, e.g., bisphenol-A, carbonate linkage. Other groups which are represented by R will occur to those skilled in the art. Compounds of this type are disclosed in U.S. Pat. No. 3,647,747 and U.S. Pat. No. 3,334,154 both of which are incorporated by reference.

Ar and Ar' are mono- or polycarbocyclic aromatic groups such as phenylene, biphenylene, terphenylene, naphthylene, and the like. Ar and Ar' may be the same or different.

Y is a substituent selected from the group consisting of organic, inorganic or organometallic radicals. The substituents represented by Y include (1) halogen, e.g., chlorine, bromine, iodine, or fluorine or (2) ether groups of the general formula OE, wherein E is a monovalent hydrocarbon radical similar to X or (3) monovalent hydrocarbon groups of the type represented by R or (4) other substituents, e.g., nitro, cyano, etc., said substituents being essentially inert provided there be at least one and preferably two halogen atoms per aryl, e.g., phenyl, nucleus.

X is a monovalent hydrocarbon group exemplified by the following: alkyl, such as methyl, ethyl, propyl, isopropyl, butyl, decyl, and the like; aryl groups, such as phenyl, naphthyl, biphenyl, xylyl, tolyl, and the like; aralkyl groups, such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used they may be alike or different.

The letter $d$ represents a whole number ranging from 1 to a maximum equivalent to the number of replaceable hydrogens substituted on the aromatic rings comprising Ar or Ar'. The letter $e$ represents a whole number ranging from 0 to a maximum controlled by the number of replaceable hydrogens on R. The letters $a$, $b$, and $c$ represent whole numbers including 0. When $b$ is not 0, neither $a$ nor $c$ may be 0. Otherwise, either $a$ or c, but not both, may be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are di-aromatics of which the following are representative:

2,2-bis-(3,5-dichlorophenyl)propane
bis-(2-chlorophenyl)methane
bis-(2,6-dibromophenyl)methane
1,1-bis-(4-iodophenyl)ethane
1,2-bis-(2,6-dichlorophenyl)ethane
1,1-bis-(2-chloro-4-iodophenyl)ethane
1,1-bis-(2-chloro-4-methylphenyl)ethane
1,1-bis-(3,5-dichlorophenyl)ethane
2,2-bis-(3-phenyl-4-bromophenyl)ethane
2,3-bis-(4,6-dichloronaphthyl)propane
2,2-bis-(2,6-dichlorophenyl)pentane
2,2-bis-(3,5-dichromophenyl)hexane
bis-(4-chlorophenyl)phenylmethane
bis-(3,5-dichlorophenyl)cyclohexylmethane
bis-(3-nitro-4-bromophenyl)methane
bis-(4-hydroxy-2,6-dichloro-3-methoxyphenyl)methane
2,2-bis-(3,5-dichloro-4-hydroxyphenyl)propane
2,2-bis-(3-bromo-4-hydroxyphenylpropane The preparation of these and other applicable biphenyls are known in the art. In place of the divalent aliphatic group in the above examples may be substituted sulfide, sulfoxy, and the like.

Included within the above structural formula are substituted benzenes exemplified by tetrabromobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromobiphenyl and halogenated diphenyl ethers, containing 2 to 10 halogen atoms.

The preferred halogen compounds for this invention are aromatic halogen compounds such as chlorinated benzene, brominated benzene, chlorinated biphenyl, chlorinated terphenyl, brominated biphenyl, brominated terphenyl or a compound comprising two phenyl radicals separated by a divalent alkylene group and having at least two chlorine or bromine atoms per phenyl nucleus, and mixtures of at least two of the foregoing.

Especially preferred are hexabromobenzene and chlorinated biphenyls or terphenyls, alone, or mixed with antimony oxide.

In general, the preferred phosphate compounds are selected from elemental phosphorus or organic phosphonic acids, phosphonates, phosphinates, phosphonites, phosphinites, phosphene oxides, phosphenes, phosphites or phosphates. illustrative is triphenyl phosphine oxide. These can be used alone or mixed with hexabromobenzene or a chlorinated biphenyl and, optionally, antimony oxide.

Typical of the preferred phosphorus compounds to be employed in this invention would be those having the general formula

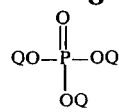

and nitrogen analogs thereof where each Q represents the same or different radicals including hydrocarbon radicals such as alkyl, cycloalkyl, aryl, alkyl substituted aryl and aryl substituted alkyl; halogen; hydrogen and combinations thereof provided that at least one of said Q's is aryl. Typical examples of suitable phosphates include, phenylbisdodecyl phosphate, phenylbisneopentyl phosphate, phenylethylene hydrogen phosphate, phenylbis-(3,5,5'-trimethylhexyl phosphate), ethyldiphenyl phosphate, 2-ethylhexyl di(p-tolyl) phosphate, diphenyl hydrogen phosphate, bis(2-ethylhexyl) p-tolylphosphate, tritolyl phosphate, bis-(2-ethylhexyl)-phenyl phosphate, tri(nonylphenyl) phosphate, phenylmethyl hydrogen phosphate, di(dodecyl) p-tolyl phosphate, tricresyl phosphate, triphenyl phosphate, halogenated triphenyl phosphate, dibutylphenyl phosphate, 2-chloroethyldiphenyl phosphate, p-tolyl bis(2,5,5'-trimethylhexyl) phosphate, 2-ethylhexyldiphenyl phosphate, diphenyl hydrogen phosphate, and the like. The preferred phosphates are those where each Q is aryl. The most preferred phosphate is triphenyl phosphate. It is also preferred to use triphenyl phosphate in combination with hexabromobenzene and, optionally, antimony oxide.

Also, suitable as flame-retardant additives for this invention are compounds containing phosphorus-nitrogen bonds, such as phosphonitrilic chloride, phosphorus ester amides, phosphoric acid amides, phosphonic acid amides, phosphinic acid amides, tris(aziridinyl)-phosphine oxide or tetrakis (hydroxymethyl) phosphonium chloride. These flame-retardant additives are commercially available.

The blends may be formed by conventional techniques, that is by first dry mixing the components and, thereafter, melt blending the composition in an extruder.

By way of illustration, glass roving (a bundle of strands of filaments) is chopped into small pieces, e.g., ⅛ inch to 1 inch in length, and preferably less than ¼ inch in length and oput into an extrusion compounder with (a) the polyphenylene ether resin, (b) the alkenyl aromatic resin that is modified with a rubbery interpolymer of a mixture of monoolefins and a polyene, the flame-retardant additive(s) and (e) to produce molding pellets. The fibers are shortened and predispersed in the process, coming out at less than 1/16 inch long. In another procedure, glass filaments are ground or milled to short lengths, and are mixed with the polyphenylene ether resin, the modified alkenyl aromatic polymer and, optionally, flame retardant additive by dry blending then either fluxed on a mill and ground, or they are extruded and chopped.

In addition, compounding should be carried out to insure that the residence time in the machine is short; the temperature is carefully controlled; the frictional heat is utilized; and an intimate blend between the resins and the additives is obtained. Various pigments, fillers and processing aids may also be used according to techniques well known to those skilled in the art.

DESCRIPTION OF THE PREFERRED EMBODIMENTS

The following examples are set forth as further descriptions of the invention, but are not to be construed as limiting the invention thereto.

EXAMPLE I

A blend having the following composition was prepared:

| | Grams |
|---|---|
| poly(2,6-dimethyl-1,4-phenylene)ether (PPO, General Electric Company having a instrinsic viscosity of about 0.52 deciliters/gram measured in chloroform at 30°C). | 35 |
| polystyrene modified with a terpolymer of ethylene, propylene and 5-ethylidene-2-norbornene having a Mooney viscosity of 140 (ML-8) (prepared according to Example VIII of U.S. Pat. No. 3,538,192). | 65 |

This blend is prepared with a twin screw extruder at 585°F and the extruded pellets were molded into standard test pieces with a Newbury injection molding machine, barrel temperature 450°F.

EXAMPLE II

A blend having the following composition was prepared:

| | Gram |
|---|---|
| poly(2,6-dimethyl-1,4-phenylene) ether (PPO, General Elctric Company, having an intrinsic viscosity of about 0.52 deciliters/gram when measured in chloroform at 30°C.) | 700.0 |
| polystyrene resin modified with a rubbery interpolymer of a mixture of monoolefins and a polyene (Taflite 925-01, Mitsui Toatsu Chemical Co.). | 1300.0 |
| triphenyl phosphate | 140.0 |
| tridecyl phosphite | 10.0 |
| polyethylene (Microthene M-710) | 30.0 |
| titanium dioxide | 100.0 |

The blend was prepared with a twin-screw extruder at 585°F and the extruded pellets were molded into standard test pieces such as tensile bars with a Newbury injection molding machine, barrel temperature 450°F.

EXAMPLE III

The following composition was prepared according to the procedure set forth in EXAMPLE II:

| | Grams |
|---|---|
| poly(2,6-methyl-1,4-phenylene) ether (as used in Example II) | 1000.0 |
| polystyrene resin modified with a rubbery interpolymer of a mixture of monoolefins and a polyene (as used in Example II) | 1000.0 |
| triphenyl phosphate | 60.0 |
| tridecylphosphate | 10.0 |
| zinc sulfide | 3.0 |
| zinc oxide | 3.0 |
| polyethylene (Microthene M-710) | 30.0 |
| titanium dioxide | 100.0 |

CONTROL SPECIMENS

A first control specimen was prepared according to the method of Example II except that a polybutadiene modified, high-impact polystyrene (Foster Grant 834) was substituted for the polystyrene that was modified with a rubbery interpolymer of a mixture of monoolefins and a polyene.

A second control specimen was prepared according to the method of Example III except that a polybutadiene modified, high-impact polystyrene (Foster Grant 834) was substituted for the polystyrene that was modified with a rubber interpolymer of a mixture of monoolefins and a polyene.

A test specimen prepared in Example II and the first control specimen were heat aged in an air oven at 105°C after initial physical properties were measured. At periodic intervals the specimens were removed and tested on an Instron machine at a speed of one inch perr minute. The tensile bars of Example III and the second control specimen were processed similarly except that the oven temperature was 115°C. The results were as follows:

TABLE I

| Specimen | Alkenyl Resin | Wt. Ratio (PPO:AR) | HDT (°F) | TS (psi) | Elongation (%) | Time to Embrittlement | |
|---|---|---|---|---|---|---|---|
| | | | | | | Days at 105°C | Days at 115°C |
| Example II | rubbery interpolymer modified polystyrene | 35:65 | 202 | 7000 | 36 | 100 | — |
| First Control | polybutadiene modified polystyrene | 35:65 | 208 | 7200 | 73 | 20 | — |
| Example III | rubbery interpolymer modified polystyrene | 50:50 | 250 | 8300 | 22 | — | 90–100 |
| Second Control | polybutadiene modified polystyrene | 50:50 | 252 | 8500 | 58 | — | 25–28 |

It can be seen that the compositions of this invention at the 50:50 level of Example III show a four-fold increase in the time to embrittlement as compared to the prior art control specimen. The improvement was even greater for the 35:65 blends. The test bars according to this invention also showed much less darkening on exposure to heat-aging than did the prior control specimens.

EXAMPLE IV

BLEND A

A blend of the following composition was prepared by extrusion on a W-P twin-screw extruder:

| | Grams |
|---|---|
| poly(2,6-dimethyl-1,4-phenylene) ether (as used in Example I) | 250.0 |

-continued

| | Grams |
|---|---|
| polystyrene modified with a rubbery iterpolymer of a mixture of monoolefins and a polyene (as used in Example II) | 250.0 |
| polyethylene (Microthene M-710) | 7.5 |
| triphenyl phosphate | 15.0 |
| tridecyl phosphite | 2.5 |
| zinc sulfide | 0.75 |
| zinc oxide | 0.75 |

Standard test pieces were molded from the chopped extrudate in a Newbury injection molding machine. Three additional blends of the same composition were prepared using the same technique except that a reinforcement was incorporated prior to extrusion:

| | |
|---|---|
| BLEND B | 8% (by wt.) of glass fibers (497 BB chopped glass fibers). Ownes Corning Fiberglass Corp. |
| BLEND C | 16% (by wt.) of acicular calcium silicate (Wallastonite F-1, Interpace Corp.). |
| BLEND D | 16% (by wt.) of potassium titanate (Fybex, Dupont). |

The blends were tested and the following results were noted:

TABLE II

| Blend | Filler | Tensile Strength (psi) | Flexural Strength (psi) | Flexural Modulus | HDT (°C) |
|---|---|---|---|---|---|
| A | none | 7600 | 12,300 | 472,000 | 113 |
| B | 8% glass | 12,300 | 17,700 | 644,000 | 120 |
| C | 16% calcium silicate | 10,600 | 15,600 | 618,000 | 120 |
| D | 16% potassium titanate | 13,800 | 20,000 | 850,000 | 122 |

It can readily be seen that the reinforced blend compositons according to this invention have enhanced physical properties.

EXAMPLE V

A blend was prepared having the following composition:

| BLEND E | Grams |
|---|---|
| poly(2,6-dimethyl-1,4-phenylene) ether (as used in Example I) | 250.0 |
| polystyrene resin modified with a rubber interpolymer of monoolefins and a polyene (as used in Example II) | 250.0 |
| polyethylene (Microthene M-710) | 7.5 |
| titanium dioxide | 25.0 |

The blend was prepared according to the technique of Example III and standard flame bars, 1/16 inch thick were molded on a Newbury injection molding machine.

By the same technique, the following blends were prepared with the recited flame retardants added to the blend having the same composition as Blend E.

| | Flame retardant |
|---|---|
| BLEND F | triphenylphosphate (3 phr) |
| BLEND G | triphenylphosphate (5 phr) |
| BLEND H | 3,3',5,5' tetramethyl-2,2',6,6'-tetrabromo-4,4'-dihydroxybiphenyl (5 phr) and Sb$_2$O$_3$ (2 phr) |

-continued

| | Flame retardant |
|---|---|
| BLEND I | copolymer of bisphenol A and tetrabromobisphenol A containing about 21% bromine (prepared according to Example I of U.S. Pat. No. 3,647,747) (8.5 phr) and Sb$_2$O$_3$ (1 phr) |
| BLEND J | hexabromobiphenyl (3 phr) and Sb$_2$O$_3$ (1 phr) |

Test bars (1/16 inch thick) prepared from Blends E-J were tested according to the procedure of UL subject 94. The results are listed in Table III:

TABLE III

| Blend | Average Burning Time (a) (seconds) | Remarks |
|---|---|---|
| E | 57 (b) | Drip |
| F | 27 | |
| G | 16 | SE-1 |
| H | 23 | |
| I | 24 | |
| J | 21 | |

(a) Average of 10 ignitions; 5 bars, each ignited twice.
(b) First ignition only; dripping prevented reignition.

Obviously, other modifications and variations of the present invention are possible in the light of the above teachings. It is, therefore, to be understood that changes may be made in the particular embodiments of the invention described which are within the full intended scope of the invention as defined by the appended claims.

We claim:

1. A thermoplastic molding composition which comprises:
   a. from 20–65% by weight of a polyphenylene ether resin;
   b. from 35–80% by weight of an alkenyl aromatic resin that is modified with a rubbery interpolymer of a mixture of monoolefins and a polyene by polymerizing an alkenyl aromatic monomer in the presence of said rubbery interpolymer; and
   c. a flame retardant amount of a flame-retardant additive.

2. The molding composition of claim 1 wherein the polyphenylene ether resin is selected from compounds of the formula:

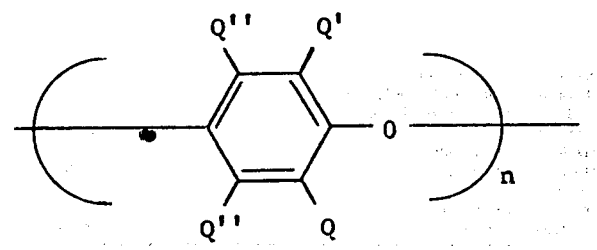

wherein Q is selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atoms and the phenol nucleus; Q' and Q'' are the same as Q, and in addition, halogen with the proviso that Q and Q' are all free of a tertiary carbon atom; and $n$ is an integer of at least 50.

3. A thermoplastic molding composition which comprises:
   a. from 20–65% by weight of a polyphenylene ether resin;
   b. from 35–80% by weight of an alkenyl aromatic resin that is modified with a rubbery interpolymer which comprises 10–90 mole percent of ethylene, 10–90 mole percent of an alpha-olefin having from 3–10 carbon atoms and from 0.1–10 mole percent of a polyene that is a non-conjugated cyclic or open chain diene that has from 5–10 carbon atoms and is obtained by polymerizing an alkenyl aromatic monomer in the presence of said rubbery interpolymer; and
   c. a flame retardant amount of a flame retardant additive.

4. The molding composition of claim 3 wherein said flame retardant is a halogenated organic compound, a halogenated organic compound in admixture with an antimony compound, elemental phosphorus or a phosphorus compound or compounds containing phosphorus-nitrogen bonds or a mixture of two or more of the foregoing.

5. The molding composition of claim 3 wherein said flame retardant comprises a mixture of an organic bromine containing compound with antimony oxide.

6. The molding composition of claim 3 wherein said flame retardant is triphenylphosphate.

7. The molding composition of claim 4 which includes 5–15 parts per hundred parts of components (a) plus (b) of a phosphorus compound.

8. The molding composition of claim 4 which includes from 2 to 20 parts by weight per hundred parts of components (a) plus (b) of a halogenated aromatic compound and from 1 to 10 parts by weight per hundred parts of components (a) plus (b) of antimony oxide.

9. The molding composition of claim 1 wherein said flame retardant is a halogenated organic compound, a halogenated organic compound in admixture with an antimony compound, elemental phosphorus or a phosphorus compound or compounds containing phosphorus-nitrogen bonds or a mixture of two or more of the foregoing.

* * * * *

UNITED STATES PATENT AND TRADEMARK OFFICE
CERTIFICATE OF CORRECTION

PATENT NO. : 3,974,235

DATED : August 10, 1976

INVENTOR(S) : Glenn D. Cooper; Visvaldis Abolins

It is certified that error appears in the above–identified patent and that said Letters Patent are hereby corrected as shown below:

| | | |
|---|---|---|
| Col. 1, line 59, | "componenet" should be | --component-- |
| Col. 2, line 5, | "composition" should be | --compositions-- |
| Col. 2, line 67, | "substitute" should be | --substituent-- |
| Col. 4, line 28, | "flass" should be | --glass-- |
| Col. 4, line 34, | "concentrations" should be | --concentrates-- |
| Col. 4, line 48, | "consideable" should be | --considerable-- |
| Col. 7, line 31, | "2,2-bis-(3-bromo-4-hydroxyphenylpropane should be --2,2-bis-(3-bromo-4-hydroxy-phenyl) propane-- | |
| Col. 8, line 48, | "oput" should be | --put-- |
| Col. 10, line 34, | "perr" should be | --per-- |
| Col. 11, line 2, | "iterpolymer" should be | --interpolymer-- |

UNITED STATES PATENT OFFICE
CERTIFICATE OF CORRECTION

Patent No. 3,974,235  Dated August 10, 1976

Inventor(s) Glenn D. Cooper et al.  Page 2 of 2

It is certified that error appears in the above-identified patent and that said Letters Patent are hereby corrected as shown below:

Column 11, line 19, "Ownes" should be -- Owens --.

Signed and Sealed this

Thirty-first Day of May 1977

[SEAL]

Attest:

RUTH C. MASON
Attesting Officer

C. MARSHALL DANN
Commissioner of Patents and Trademarks